(12) United States Patent
Lee et al.

(10) Patent No.: US 11,942,868 B2
(45) Date of Patent: Mar. 26, 2024

(54) POWER PROVIDER AND DISPLAY DEVICE INCLUDING THE SAME

(71) Applicant: SAMSUNG DISPLAY CO., LTD., Yongin-si (KR)

(72) Inventors: Yoon Young Lee, Yongin-si (KR); Sung Chun Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/153,132

(22) Filed: Jan. 11, 2023

(65) Prior Publication Data

US 2023/0318458 A1    Oct. 5, 2023

(30) Foreign Application Priority Data

Mar. 29, 2022    (KR) .......................... 10-2022-0039134

(51) Int. Cl.
*H02M 3/158*    (2006.01)
*G09G 3/3233*   (2016.01)
(Continued)

(52) U.S. Cl.
CPC ........ *H02M 3/1584* (2013.01); *G09G 3/3233* (2013.01); *H02M 1/0009* (2021.05); *H02M 1/088* (2013.01); *G09G 2300/0819* (2013.01); *G09G 2300/0842* (2013.01); *G09G 2320/0247* (2013.01); *G09G 2330/021* (2013.01); *G09G 2330/028* (2013.01); *H02M 3/156* (2013.01);
(Continued)

(58) Field of Classification Search
CPC .. H02M 3/156; H02M 3/1584; H02M 3/1586; H02M 3/33507; H02M 1/0009; H02M 1/088; G09G 3/3233; G09G 2300/0819; G09G 2300/0842; G09G 2320/0247; G09G 2330/021; G09G 2330/028
USPC ....................................................... 345/211
See application file for complete search history.

(56) References Cited

U.S. PATENT DOCUMENTS 9,728,118 B2   8/2017  Park
10,741,117 B2  8/2020  Park
(Continued)

FOREIGN PATENT DOCUMENTS

KR    10-2018-0094206    8/2018
KR    10-2020-0055843    5/2020
KR    10-2278326         7/2021

*Primary Examiner* — Tom V Sheng

(74) *Attorney, Agent, or Firm* — F. Chau & Associates, LLC

(57) ABSTRACT

A power provider includes: first, second, and third inductors; a first transistor connected to the second inductor; a second transistor connected to the third inductor; and a power integrated chip (IC) including input terminals connected to the first, second, and third inductors, and an output terminal connected to a power line. The power provider may supply the power voltage using the first inductor and the power IC when power current is less than a first reference value, supply the power voltage using the second inductor, the first transistor, and the power IC when the power current is greater than the first reference value and less than a second reference value, and supply the power voltage using the second and third inductors, the first and second transistors, and the power IC when the power current is greater than the second reference value.

20 Claims, 10 Drawing Sheets

(51) Int. Cl.
  *H02M 1/00*   (2006.01)
  *H02M 1/088*  (2006.01)
  *H02M 3/156*      (2006.01)
  *H02M 3/335*      (2006.01)

(52) U.S. Cl.
  CPC ...... *H02M 3/1586* (2021.05); *H02M 3/33507* (2013.01)

(56)              References Cited

U.S. PATENT DOCUMENTS

| | | | |
|---|---|---|---|
| 11,005,372 B2 * | 5/2021 | Chang | H02M 3/1584 |
| 11,005,375 B2 | 5/2021 | Park | |
| 2012/0294046 A1 * | 11/2012 | Nate | H02M 1/4225 |
| | | | 363/21.01 |
| 2014/0327417 A1 * | 11/2014 | Zhu | H02M 3/156 |
| | | | 323/266 |
| 2019/0172379 A1 * | 6/2019 | Park | H02M 3/158 |
| 2020/0153344 A1 * | 5/2020 | Park | H02M 3/158 |
| 2021/0226536 A1 * | 7/2021 | Couleur | H02M 1/0064 |
| 2021/0408911 A1 * | 12/2021 | Upadhyaya | H02M 1/0009 |
| 2022/0294352 A1 * | 9/2022 | Wu | H02M 1/0032 |
| 2023/0066237 A1 * | 3/2023 | Lee | H02M 3/158 |

\* cited by examiner

POWER PROVIDER AND DISPLAY DEVICE INCLUDING THE SAME

CROSS-REFERENCE TO RELATED APPLICATION

The present application claims priority under 35 U.S.C. § 119(a) to Korean patent application number 10-2022-0039134 filed on Mar. 29, 2022, in the Korean Intellectual Property Office, the entire disclosure of which is incorporated by reference in its entirety herein.

1. Technical Field

Various embodiments of the present disclosure relate to a power provider (e.g., a power supply device) and a display device including the power provider.

2. Discussion of Related Art

Electronic devices such as smart phones, digital cameras, notebook computers, navigation systems, and smart televisions, include display devices for displaying images. The display device includes a display panel that generates and displays an image and may include various input devices such as a sensor unit for sensing a user's input. Examples of display devices include a liquid crystal display device and an organic light-emitting display device.

The display device may use pixels to display an image. The pixels may be supplied with a power voltage from a power line to which the pixels are connected in common. As the luminance of an image displayed on the pixels is increased (as a load is increased), power current is increased. As the luminance of an image displayed on the pixels is reduced (as the load is reduced), the power current is reduced.

However, present display devices do not include a power provider capable of efficiently providing the needed power current.

SUMMARY

Various embodiments of the present disclosure are directed to a power provider (e.g., a power supply device) capable of providing a power voltage efficiently in terms of power consumption in response to the magnitude of power current, and are directed to a display device including the power provider.

An embodiment of the present disclosure provides a power supply device including: a first inductor; a second inductor; a third inductor; a first transistor including a first electrode configured to receive an input voltage, and a second electrode connected to a first electrode of the second inductor; a second transistor including a first electrode configured to receive the input voltage, and a second electrode connected to the third inductor; and a power integrated chip (IC) including input terminals respectively connected to the first inductor, the second inductor, and the third inductor, and an output terminal connected to a power line. The power supply device supplies a power voltage using the first inductor and the power IC when power current flowing through the power line is less than a first reference value, supplies the power voltage using the second inductor, the first transistor, and the power IC when the power current is increased and is greater than the first reference value and less than a second reference value, and supplies the power voltage using the second inductor, the third inductor, the first transistor, the second transistor, and the power IC when the power current is increased and is greater than the second reference value.

The power supply device may supply the power voltage using the second inductor, the third inductor, the first transistor, the second transistor, and the power IC when the power current is greater than the third reference value, supply the power voltage using the second inductor, the first transistor, and the power IC when the power current is reduced and is greater than a fourth reference value and less than the third reference value, and supply the power voltage using the first inductor and the power IC when the power current is reduced and is less than the fourth reference value.

The third reference value may be greater than the first reference value and less than the second reference value. The fourth reference value may be less than the first reference value.

The power IC may include: a third transistor including a first electrode connected to the second inductor, and a second electrode connected to the output terminal; a fourth transistor including a first electrode connected to the third inductor, and a second electrode connected to the output terminal; a fifth transistor including a first electrode configured to receive the input voltage, and a second electrode connected to the first inductor; and a sixth transistor including a first electrode connected to the first inductor, and a second electrode connected to the output terminal.

A surface area of each of the first transistor and the second transistor may be greater than a surface area of each of the third transistor, the fourth transistor, the fifth transistor, and the sixth transistor.

The surface area of the third transistor may be identical to the surface area of the fourth transistor. The surface area of the first transistor may be identical to the surface area of the second transistor. An inductance of the second inductor may be identical to an inductance of the third inductor.

An inductance of the first inductor may be greater than the inductance of the second inductor.

A switching frequency of the first transistor or the second transistor may be greater than a switching frequency of the fifth transistor.

The power supply device may further include: a current sensor configured to sense the power current through the second electrode of the third transistor, the second electrode of the fourth transistor, the second electrode of the sixth transistor, and provide sensing information based on the sensed power current; and a converter selector configured to generate a first select signal, a second select signal, and a third select signal based on the sensing information.

The power supply device may further include: a first gate driver configured to control turning on or off of the fifth transistor and the sixth transistor based on the first select signal and the sensing information; a second gate driver configured to control turning on or off of the first transistor and the third transistor based on the second select signal and the sensing information; and a third gate driver configured to control turning on or off of the second transistor and the fourth transistor based on the third select signal and the sensing information.

The power supply device may further include: feedback resistors connected in series to the output terminal; and a control voltage generator configured to generate a control voltage based on a feedback voltage received from a node between the feedback resistors. The first gate driver, the second gate driver, and the third gate driver may control turning on or off of the corresponding transistors based on the control voltage.

An embodiment of the present disclosure provides a display device including: a plurality of pixels configured to display an image; and a power supply device configured to supply a power voltage to a power line connected in to the plurality of pixels. The power supply device includes: a first inductor; a second inductor; a third inductor; a first transistor connected between an input voltage and the second inductor; a second transistor connected between the input voltage and the third inductor; and a power integrated chip (IC) including input terminals respectively connected to the first inductor, the second inductor, and the third inductor, and an output terminal connected to the power line. The power supply device may supply the power voltage using the first inductor and the power IC when power current flowing through the power line is less than a first reference value, supply the power voltage using the second inductor, the first transistor, and the power IC when the power current is increased and is greater than the first reference value and less than a second reference value, and supply the power voltage using the second inductor, the third inductor, the first transistor, the second transistor, and the power IC when the power current is increased and is greater than the second reference value.

The power supply device may supply the power voltage using the second inductor, the third inductor, the first transistor, the second transistor, and the power IC when the power current is greater than the third reference value, supply the power voltage using the second inductor, the first transistor, and the power IC when the power current is reduced and is greater than a fourth reference value and less than the third reference value, and supply the power voltage using the first inductor and the power IC when the power current is reduced and is less than the fourth reference value.

The third reference value may be greater than the first reference value and less than the second reference value. The fourth reference value may be less than the first reference value.

The power IC may include: a third transistor including a first electrode connected to the second inductor, and a second electrode connected to the output terminal; a fourth transistor including a first electrode connected to the third inductor, and a second electrode connected to the output terminal; a fifth transistor including a first electrode configured to receive the input voltage, and a second electrode connected to the first inductor; and a sixth transistor including a first electrode connected to the first inductor, and a second electrode connected to the output terminal.

A surface area of each of the first transistor and the second transistor may be greater than a surface area of each of the third transistor, the fourth transistor, the fifth transistor, and the sixth transistor.

The surface area of the third transistor may be identical to the surface area of the fourth transistor. The surface area of the first transistor may be identical with the surface area of the second transistor. An inductance of the second inductor may be identical to an inductance of the third inductor.

An inductance of the first inductor may be greater than the inductance of the second inductor.

A switching frequency of the first transistor or the second transistor may be greater than a switching frequency of the fifth transistor.

The power supply device may include: a current sensor configured to sense the power current through the second electrode of the third transistor, the second electrode of the fourth transistor, the second electrode of the sixth transistor, and provide sensing information based on the sensed power current; a converter selector configured to generate a first select signal, a second select signal, and a third select signal based on the sensing information; feedback resistors connected in series to the output terminal; a control voltage generator configured to generate a control voltage based on a feedback voltage received from a node between the feedback resistors; a first gate driver configured to control turning on or off of the fifth transistor and the sixth transistor based on the first select signal, the sensing information, and the control voltage; a second gate driver configured to control turning on or off of the first transistor and the third transistor based on the second select signal, the sensing information, and the control voltage; and a third gate driver configured to control turning on or off of the second transistor and the fourth transistor based on the third select signal, the sensing information, and the control voltage.

DETAILED DESCRIPTION

Figure 1:
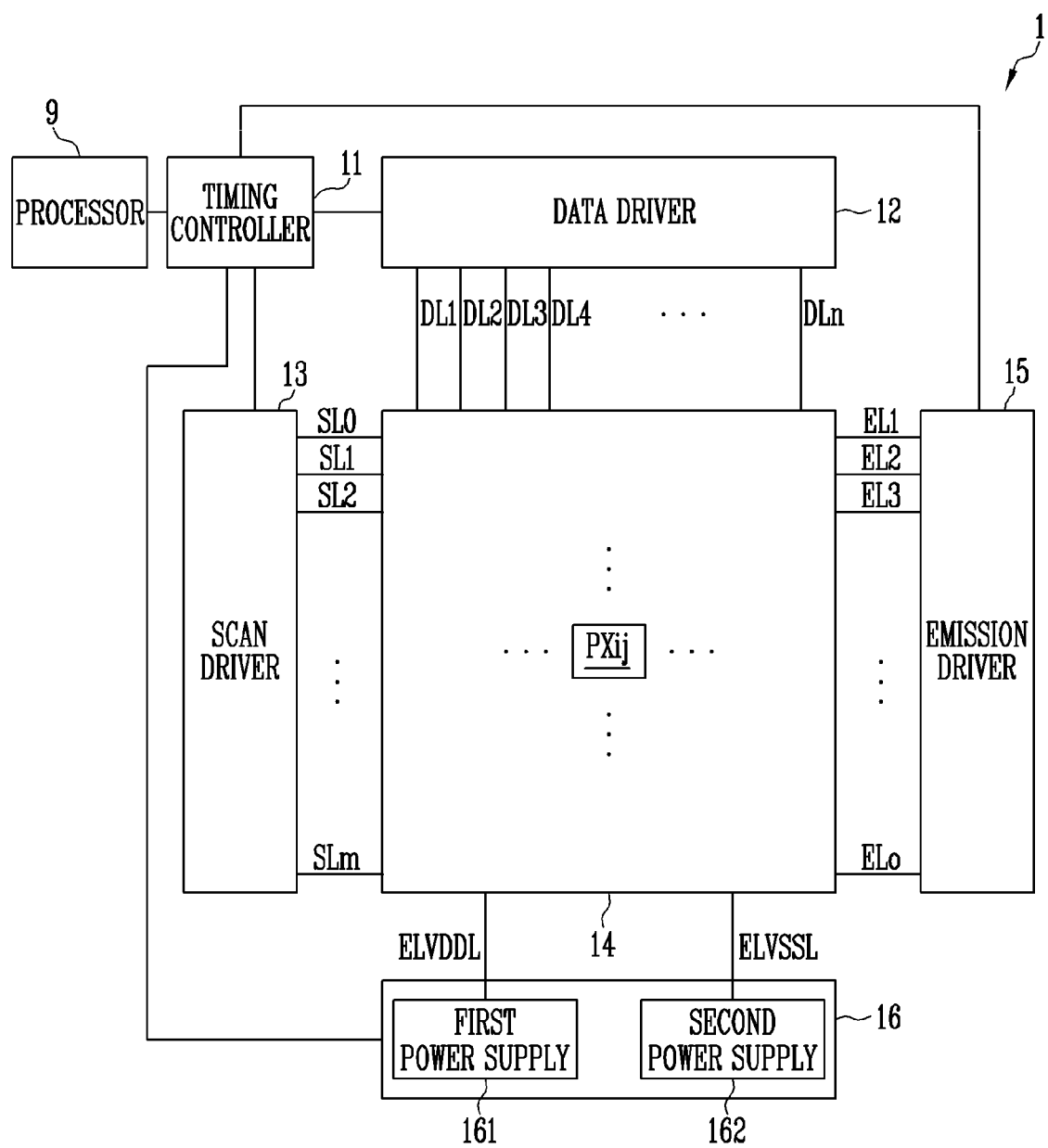
FIG. 1 is a diagram for describing a display device in accordance with an embodiment of the present disclosure.

Hereinafter, embodiments of the present invention will be described in detail with reference to the attached drawings, such that those skilled in the art can easily implement the present invention. The present disclosure may be implemented in various forms, and is not limited to the embodiments to be described herein below.

Reference should be made to the drawings, in which similar reference numerals are used throughout the different drawings to designate similar components. Therefore, the aforementioned reference numerals may be used in other drawings.

The drawings are intended to be drawn to scale with angles and relative proportions representing at least one embodiment, but changes in angles and scale are considered part of the inventive concept.

Furthermore, the expression "being the same" may mean "being substantially the same". In other words, the expression "being the same" may include a range that can be tolerated by those skilled in the art. The other expressions may also be expressions from which "substantially" has been omitted.

FIG. 1 is a diagram for describing a display device 1 in accordance with an embodiment of the present disclosure.

Referring to FIG. 1, the display device 1 may include a processor 9, a timing controller 11 (e.g., a control circuit), a data driver 12 (e.g., a driver circuit), a scan driver 13 (e.g., driver circuit), a pixel component 14, an emission driver 15, and a power provider 16 (e.g., a power supplying circuit). The configuration of the foregoing functional components pertaining to, for example, whether to integrate the foregoing functional components on one IC or a plurality of ICs, may be changed in various ways depending on the specifications of the display device 1.

The timing controller 11 may receive grayscale signals and timing signals for each frame period from the processor 9. The processor 9 may correspond to at least one of a graphics processing unit (GPU), a central processing unit (CPU), an application processor (AP), and the like. The timing signals may include a vertical synchronization signal, a horizontal synchronization signal, a data enable signal, and the like.

Each cycle of the vertical synchronization signal may correspond to a corresponding frame period. Each cycle of the horizontal synchronization signal may correspond to a corresponding horizontal period. The grayscale signals may be supplied on a horizontal-line basis in response to a pulse of an enable level of a data enable signal during each horizontal period. The horizontal line may refer to pixels (e.g., a pixel line) connected to the same scan line and the same emission line.

The timing controller 11 may render the gray scale signals in consideration of the specifications of the display device 1. For example, the processor 9 may provide a red grayscale signal, a green grayscale signal, and a blue grayscale signal for each unit dot. For example, in the case in which a pixel component 14 has an RGB stripe structure, pixels may correspond one to one to respective grayscale signals. In this case, rendering of the grayscale signals may not be necessary. However, for example, in the case where the pixel circuit 14 has a PENTILE™ structure, because adjacent unit dots may share a pixel, the pixels may not correspond one to one to the respective grayscale signals. In this case, the rendering of the grayscale signals may be necessary. Grayscale signals that have been rendered or have not been rendered may be provided to the data driver 12. Furthermore, the timing controller 11 may provide a data control signal to the data driver 12. In addition, the timing controller 11 may provide a scan control signal to the scan driver 13, and may provide an emission control signal to the emission driver 15. The pixel component 14 may be a display panel including the pixels.

The data driver 12 may generate, using the grayscale signals and the data control signal that are received from the timing controller 11, data voltages (i.e., data signals) to be provided to data lines DL1, DL2, DL3, . . . , DLn. Here, n is an integer greater than 0.

The scan driver 13 may generate, using scan control signals (e.g., a clock signal, a scan start signal, and the like) received from the timing controller 11, scan signals to be provided to the scan lines SL0, SL1, SL2, . . . , SLm. The scan driver 13 may sequentially supply scan signals each having a turn-on level pulse to the scan lines SL0 to SLm. The scan driver 13 may include scan stages configured in the form of a shift register. The scan driver 13 may generate scan signals in such a way as to sequentially transmit a scan start signal having a turn-on level pulse to a subsequent scan stage under the control of a clock signal. Here, m is an integer greater than 0.

The emission driver 15 may generate, using emission control signals (e.g., a clock signal, an emission stop signal, and the like) received from the timing controller 11, emission signals to be provided to the emission lines EL1, EL2, EL3, . . . , ELo. The emission driver 15 may sequentially supply emission signals each having a turn-on level pulse to the emission lines EL1 to ELo. The emission driver 15 may include emission stages, each of which is configured in the form of a shift register. The emission driver 15 may generate emission signals in such a way as to sequentially transmit an emission stop signal having a turn-off level pulse to a subsequent emission stage under the control of a clock signal. Here, o is an integer greater than 0.

The pixel component 14 includes pixels. Each pixel PXij may be connected to a corresponding data line (e.g., DL1), a corresponding scan line (e.g., SL0), and an emission line (e.g., EL1). The pixels may include pixels configured to emit a first color of light, pixels configured to emit a second color of light, and pixels configured to emit a third color of light. The first color, the second color, and the third color may be different colors. For example, the first color may be one of red, green, and blue. The second color may be one of red, green, and blue, other than the first color. The third color may be the remaining color among the red, green, and blue, other than the first color and the second color. Furthermore, in lieu of red, green, and blue, magenta, cyan, and yellow may be used as the first to third colors.

The power provider 16 may include a first power supply 161 and a second power supply 162. The first power supply 161 and the second power supply 162 may be configured as different integrated chips (IC), or may be integrated into one IC. Each of the first power supply 161 and the second power supply 162 may be formed of a voltage converter. For example, each of the first power supply 161 and the second power supply 162 may be implemented as a buck converter, a boost converter, a buck-boost converter, or the like.

The first power supply 161 may provide a first power voltage to the pixel component 14 through a first power line ELVDDL. The pixels of the pixel component 14 may be connected in common to the first power line ELVDDL, and may be supplied with the same first power voltage. The second power supply 162 may provide a second power voltage to the pixel component 14 through a second power line ELVSSL. The pixels of the pixel component 14 may be connected in common to the second power line ELVSSL, and may be supplied with the same second power voltage. During a display period of the pixel component 14, the first power voltage may be greater than the second power voltage. Power current flowing out of the first power supply 161 through the first power line ELVDDL may flow into the second power supply 162 through the second power line ELVSSL.

Figure 2:
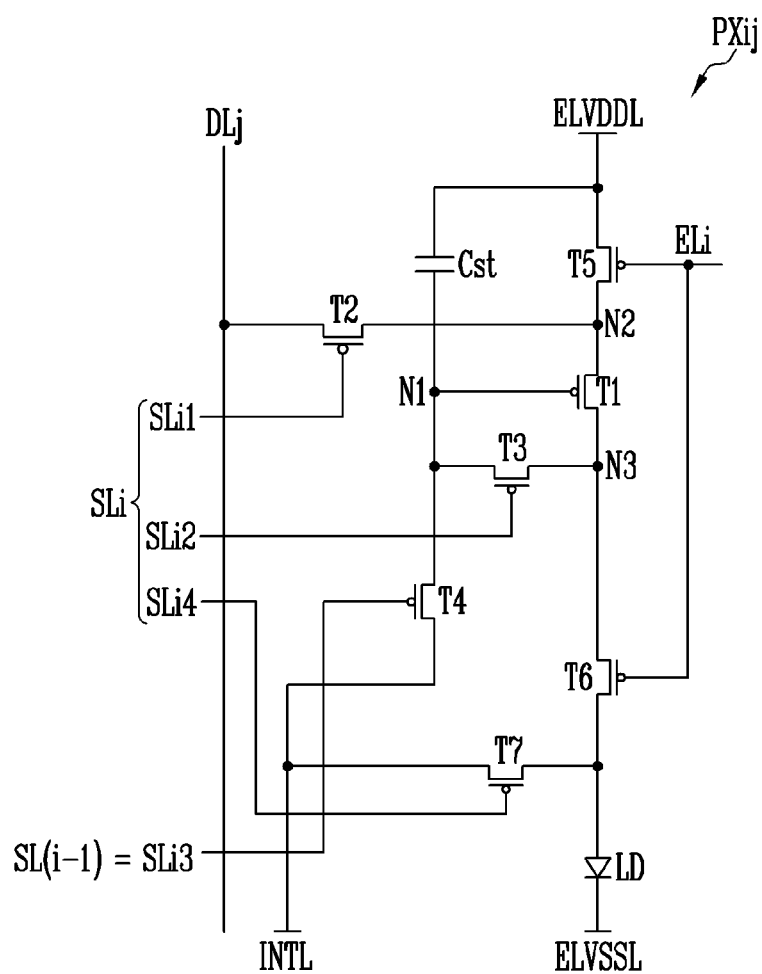
FIG. 2 is a diagram for describing a pixel in accordance with an embodiment of the present disclosure.

FIG. 2 is a diagram for describing a pixel PXij in accordance with an embodiment of the present disclosure.

Referring to FIG. 2, the pixel PXij includes transistors T1, T2, T3, T4, T5, T6, and T7, a storage capacitor Cst, and a light emitting element LD.

Hereinafter, a circuit (e.g., a PMOS circuit) of the pixel PXij configured of P-type transistors will be described by way of example. However, the circuit may be configured of N-type transistors by changing the polarity of the voltage to be applied to the gate terminal of each transistor to form an NMOS circuit. In another embodiment, the circuit may be configured of a combination of a P-type transistor and an N-type transistor. The term "P-type transistor" is a general name for transistors in which the amount of current increases when a voltage difference between a gate electrode and a source electrode increases in a negative direction. The term "N-type transistor" is a general name for transistors in which the amount of current increases when a voltage difference between a gate electrode and a source electrode increases in a positive direction. Each transistor may be configured in various forms such as a thin film transistor (TFT), a field effect transistor (FET), and a bipolar junction transistor (BJT).

The first transistor T1 may include a gate electrode connected to a first node N1, a first electrode connected to a second node N2, and a second electrode connected to a third node N3.

The first transistor T1 may be referred to as a driving transistor.

The transistor T2 may include a gate electrode connected to a scan line SLi1, a first electrode connected to a data line DLj, and a second electrode connected to the node N2. The transistor T2 may be referred to as a scan transistor.

The third transistor T3 may include a gate electrode connected to a scan line SLi2, a first electrode connected to the first node N1, and a second electrode connected to the third node N3. The transistor M3 may be referred to as a compensation transistor.

The transistor T4 may include a gate electrode connected to a scan line SLi3, a first electrode connected to the first node N1, and a second electrode connected to an initialization line INTL. The transistor T4 may be referred to as a gate initialization transistor.

The transistor T5 may include a gate electrode connected to an i-th emission line ELi, a first electrode connected to the first power line ELVDDL, and a second electrode connected to the node N2. The transistor T5 may be referred to as an emission transistor. In an embodiment, the gate electrode of the transistor T5 is connected to an emission line different from the emission line to which a gate electrode of the transistor T6 is connected.

The transistor T6 may include the gate electrode connected to the i-th emission line ELi, a first electrode connected to the third node N3, and a second electrode connected to an anode of the light emitting element LD. The transistor T6 may be referred to as an emission transistor. In an embodiment, the gate electrode of the transistor T6 is connected to an emission line different from the emission line that is connected to the gate electrode of the transistor T5.

The transistor T7 may include a gate electrode connected to a scan line SLi4, a first electrode connected to the initialization line INTL, and a second electrode connected to the anode of the light emitting element LD. The transistor T7 may be referred to as a light-emitting-element initialization transistor.

The storage capacitor Cst may include a first electrode connected to the first power line ELVDDL, and a second electrode connected to the first node N1.

The light emitting element LD may include an anode connected to the second electrode of the transistor T6, and a cathode connected to the second power line ELVSSL. The light emitting element LD may be a light emitting diode. The light emitting element LD may be formed of an organic light emitting diode, an inorganic light emitting diode, a quantum dot/well light emitting diode, or the like. The light emitting element LD may emit light having any one of a first color, a second color, and a third color. Although in the present embodiment only one light emitting element LD is provided in each pixel, a plurality of light emitting elements may be provided in each pixel in another embodiment. Here, the plurality of light emitting elements may be connected in series, parallel, or series-parallel to each other.

A first power voltage may be applied to the first power line ELVDDL. A second power voltage may be applied to the second power line ELVSSL. An initialization voltage may be applied to the initialization line INTL. For example, the first power voltage may be greater than the second power voltage. For example, the initialization voltage may be the same as or greater than the second power voltage. For example, the initialization voltage may correspond to the lowest data voltage among data voltages that can be provided. In an embodiment, the magnitude of the initialization voltage is less than the magnitudes of the data voltages that can be provided.

Figure 3:
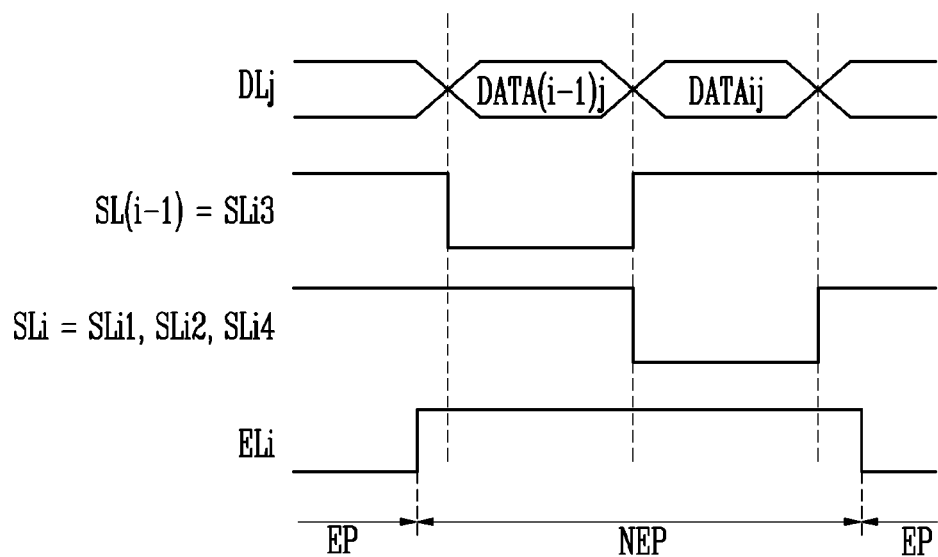
FIG. 3 is a diagram for describing a method of driving the pixel of FIG. 2.

FIG. 3 is a diagram for describing a method of driving the pixel of FIG. 2.

Hereinafter, for the convenience of explanation, it is assumed that each of the scan lines SLi1, SLi2, and SLi4 is an i-th scan line SLi, and that the scan line SLi3 is an i−1-th scan line SL(i−1). Here, connection relationships between the scan lines SLi1, SLi2, SLi3, and SLi4 may be changed in various ways depending on the embodiments. For example, the scan line SLi4 may be an i−1-th scan line or an i+1-th scan line.

First, an emission signal having a turn-off level (a logic high level) may be applied to the i-th emission line ELi. A data voltage DATA(i−1)j for an i−1-th pixel may be applied to the data line DLj. A scan signal having a turn-on level (a logic low level) may be applied to the scan line SLi3. Whether the logic level is high or low may be changed depending on whether the transistor is a P-type or an N-type.

Here, since a scan signal having a turn-off level is applied to the scan lines SLi1 and SLi2, the transistor T2 is turned off, so that the data voltage DATA(i−1)j for the i−1-th pixel may be prevented from being drawn into or applied to the pixel PXij.

Here, since the fourth transistor T4 is turned on, the first node N1 is connected to the initialization line INTL, and the voltage of the first node N1 is initialized. Since an emission signal having a turn-off level is applied to the emission line ELi, the transistors T5 and T6 are turned off, and the light emitting element LD may be prevented from being unnecessarily operated during an initialization voltage application process.

Next, a data voltage DATAij for the i-th pixel PXij is applied to the data line DLj, and a scan signal having a turn-on level is applied to the scan lines SLi1 and SLi2. Hence, the transistors T2, T1, and T3 enter a state capable of conducting electricity, and the data line DLj and the first node N1 become electrically connected to each other. Therefore, a compensation voltage obtained by subtracting a threshold voltage of the transistor T1 from the data voltage DATAij is applied to the second electrode (i.e., the first node N1) of the storage capacitor Cst. The storage capacitor Cst may maintain a voltage corresponding to the difference between the first power voltage and the compensation voltage. This period may be referred to as a threshold voltage compensation period or a data write period.

Furthermore, in the case in which the scan line SLi4 is an i-th scan line, the transistor T7 is turned on, so that the anode of the light emitting element LD and the initialization line INTL become connected, and the light emitting element LD may be initialized with the amount of charges corresponding to the difference between the initialization voltage and the second power voltage.

Thereafter, as an emission signal having a turn-on level is applied to the i-th emission line ELi, the transistors T5 and T6 may conduct electricity. Therefore, a driving current path that connects the first power line ELVDDL, the transistor T5, the transistor T1, the transistor T6, the light emitting element LD, and the second power line ELVSSL may be formed.

The amount of driving current that flows through the first electrode and the second electrode of the first transistor T1 may be adjusted in response to the voltage maintained in the storage capacitor Cst. The light emitting element LD may emit light at a luminance corresponding to the amount of driving current. The light emitting element LD may emit light until an emission signal having a turn-off level is applied to the emission line ELi. The sum of magnitudes of driving currents that flow through the pixels of the pixel component 14 may be the same as the magnitude of power current.

When the emission signal is at a turn-on level, pixels that receive the corresponding emission signal may be in a display state. Therefore, a period during which the emission signal is at a turn-on level may be referred to as an emission period EP (or an emission enable period). Furthermore, when the emission signal is at a turn-off level, pixels that receive the corresponding emission signal may be in a non-display state. Therefore, the period during which the emission signal is at a turn-off level may be referred to as a non-emission period NEP (or an emission inhibit period).

The non-emission period NEP described with reference to FIG. 3 may be for preventing the pixel PXij from emitting light at an undesired luminance during the initialization period and the data write period.

While data written in the pixel PXij is maintained (e.g., during one frame period), one or more non-emission periods NEP may be added. The reason for this is because of the fact that, as the emission period EP is reduced, low gray scales may be effectively expressed, or motion in an image may be smoothly blur-processed.

Figure 4:
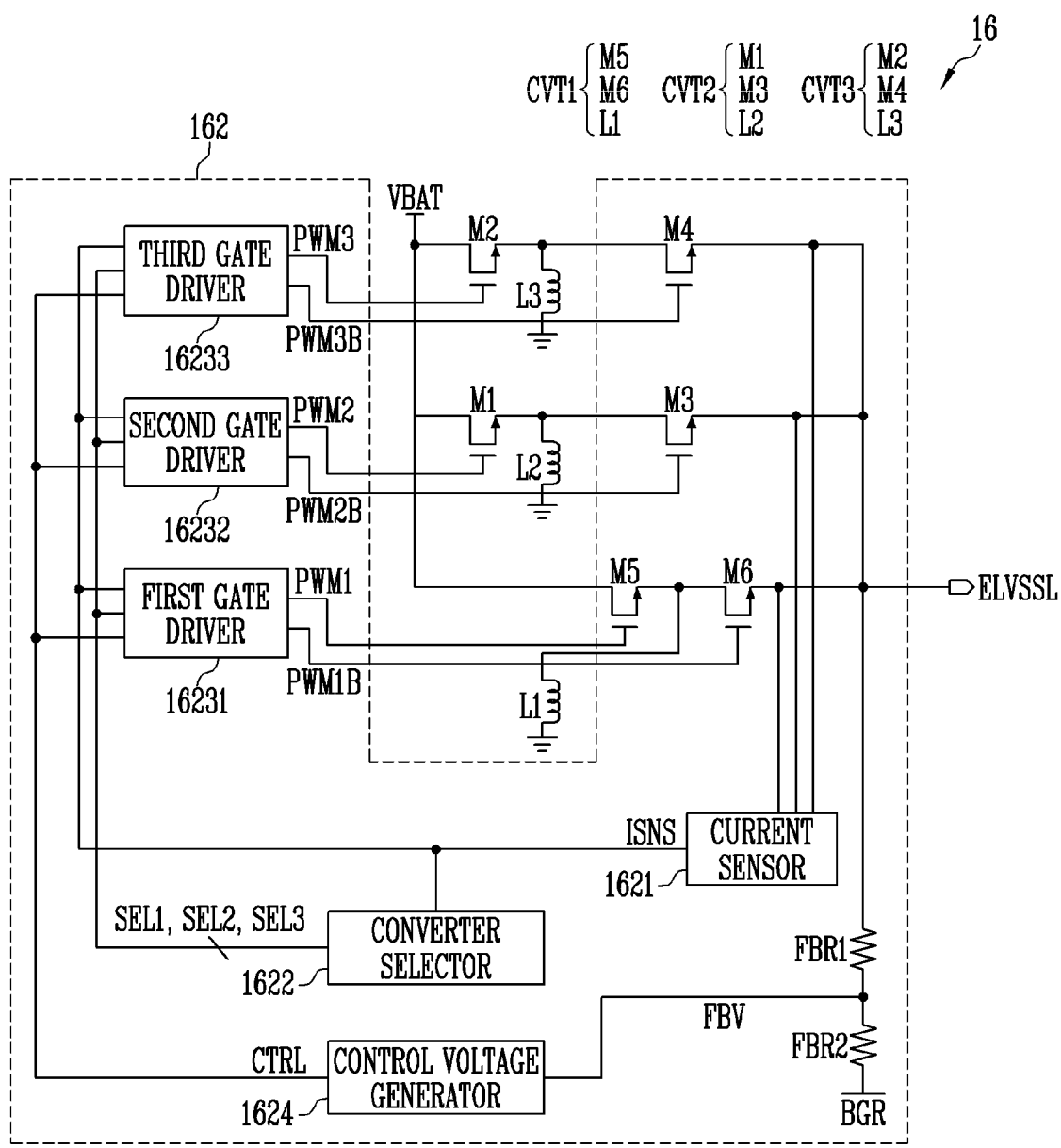
FIG. 4 is a diagram for describing a power provider (e.g., a power supply device) in accordance with an embodiment of the present disclosure.

FIG. 4 is a diagram for describing the power provider 16 in accordance with an embodiment of the present disclosure.

Referring to FIG. 4, the power provider 16 in accordance with an embodiment of the present disclosure includes a first inductor L1, a second inductor L2, a third inductor L3, a first transistor M1, a second transistor M2, and a second power supply 162. Here, the second power supply 162 may be formed of an integrated chip (IC). Referring to FIG. 1, the power provider 16 may further include a first power supply 161. The first power supply 161 may have a different structure from that of the second power supply 162.

The first inductor L1 may include a first electrode connected to an input terminal of the second power supply 162, and a second electrode connected to the ground. The second inductor L2 may include a first electrode connected to an input terminal of the second power supply 162, and a second electrode connected to the ground. The third inductor L3 may include a first electrode connected to an input terminal of the second power supply 162, and a second electrode connected to the ground. In an embodiment, the inductors L1, L2, and L3 are disposed outside the second power supply 162 rather than being integrated into the second power supply 162, due to relatively large volumes of the inductors L1, L2, and L3.

The first transistor M1 may include a first electrode configured to receive an input voltage VBAT, and a second electrode connected to the first electrode of the second inductor L2. The gate electrode of the first transistor M1 may receive a control signal PWM2, which is outputted from the second power supply 162.

The second transistor M2 may include a first electrode configured to receive the input voltage VBAT, and a second electrode connected to the first electrode of the third inductor L3. The gate electrode of the second transistor M1 may receive a control signal PWM3, which is outputted from the second power supply 162.

The second power supply 162 may include the input terminals that are respectively connected to the first electrode of the first inductor L1, the first electrode of the second inductor L2, and the first electrode of the third inductor L3, and an output terminal connected to the second power line ELVSSL.

The second power supply 162 in accordance with an embodiment of the present disclosure may include a third transistor M3, a fourth transistor M4, a fifth transistor M5, a sixth transistor M6, a current sensor 1621, a converter selector 1622, a control voltage generator 1624, feedback resistors FBR1 and FBR2, a first gate driver 16231, a second gate driver 16232, and a third gate driver 16233.

The third transistor M3 may include a first electrode connected to the first electrode of the second inductor L2, and a second electrode connected to the output terminal of the second power 162. A gate electrode of the third transistor M3 may receive a control signal PWM2B. The control signal PWM2B may be generated by inverting the control signal PWM2.

The fourth transistor M4 may include a first electrode connected to the third inductor L3, and a second electrode connected to the output terminal of the second power 162. A gate electrode of the fourth transistor M4 may receive a control signal PWM3B. In an embodiment, the control signal PWM3B is generated by inverting the control signal PWM3.

The fifth transistor M5 may include a first electrode configured to receive the input voltage VBAT, and a second electrode connected to the first electrode of the first inductor L1. A gate electrode of the fifth transistor M5 may receive a control signal PWM1.

The sixth transistor M6 may include a first electrode connected to the first electrode of the first inductor L1, and a second electrode connected to the output terminal of the second power 162. A gate electrode of the sixth transistor M6 may receive a control signal PWM1B. In an embodiment, the control signal PWM1B is generated by inverting the control signal PWM1.

The current sensor 1621 may sense power current through the second electrode of the third transistor M3, the second electrode of the fourth transistor M4, and the second electrode of the sixth transistor M6, and provide sensing information ISNS based on the sensed currents. For example, the current sensor 1621 may determine that the sum of the amount of current flowing from the output terminal of the second power supply 162 to the second electrode of the third transistor M3, the amount of current flowing from the output terminal of the second power supply 162 to the second electrode of the fourth transistor M4, and the amount of current flowing from the output terminal of the second power supply 162 to the second electrode of the sixth transistor M6 is a value of the power current. The sensing information ISNS may be a voltage having a magnitude corresponding to the magnitude of the power current. For example, as the magnitude of the power current is increased, the voltage value of the sensing information ISNS may be increased.

The converter selector 1622 may generate a first select signal SEL1, a second select signal SEL2, and a third select signal SEL3 based on the sensing information ISNS. The converter selector 1622 may be implemented by signal, voltage, or clock generator. For example, each of the first select signal SEL1, the second select signal SEL2, and the third select signal SEL3 may be an enable signal or a clock signal (e.g., a signal that toggles periodically between two different logic values). Here, in the case where a first select signal SEL1 is received, the first gate driver 16231 may generate pulse-width modulated control signals PWM1 and PWM1B. For example, the first gate driver 16231 may be implemented by a signal, voltage, or clock generator. In the case where a second select signal SEL2 is received, the second gate driver 16232 may generate pulse-width modulated control signals PWM2 and PWM2B. For example, the second gate driver 16232 may be implemented by a signal, voltage, or clock generator. In the case where a third select signal SEL3 is received, the third gate driver 16233 may generate pulse-width modulated control signals PWM3 and PWM3B. For example, the third gate driver 16233 may be implemented by a signal, voltage, or clock generator. A process of operating the converter selector 1622 based on the sensing information ISNS will be described with reference to FIGS. 7 to 10.

The feedback resistors FBR1 and FBR2 may be connected in series between the output terminal of the second power supply 162 and a reference voltage BGR or a node providing the reference voltage BGR. The control voltage generator 1624 may generate a control voltage CTRL based on a feedback voltage FBV received from a node between the feedback resistors FBR1 and FBR2. For example, the node is electrically connected to the feedback resistors FBR1 and FBR2. A process of generating, by the control voltage generator 1624, the control voltage CTRL may be described below with reference to FIGS. 5 and 6.

The first gate driver 16231 may control turning on or off of the fifth transistor M5 and the sixth transistor M6, based on the first select signal SEL1, the sensing information ISNS, and the control voltage CTRL. The first inductor L1, the fifth transistor M5, and the sixth transistor M6 may form a first converter CVT1. The first converter CVT1 may be an inverting buck-boost converter. For example, the first gate driver 16231 may supply control signals PWM1 and PWM1B with a difference in phase by 180° to the fifth transistor M5 and the sixth transistor M6, respectively, thus enabling the first converter CVT1 to generate a second power voltage.

The second gate driver 16232 may control turning on or off of the first transistor M1 and the third transistor M3, based on the second select signal SEL2, the sensing information ISNS, and the control voltage CTRL. The second inductor L2, the first transistor M1, and the third transistor M3 may form a second converter CVT2. The second converter CVT2 may be an inverting buck-boost converter. For example, the second gate driver 16232 may supply control signals PWM2 and PWM2B with a difference in phase by 180° to the first transistor M1 and the third transistor M3, respectively, thus enabling the second converter CVT2 to generate a second power voltage.

The third gate driver 16233 may control turning on or off of the second transistor M2 and the fourth transistor M4, based on the third select signal SEL3, the sensing information ISNS, and the control voltage CTRL. The third inductor L3, the second transistor M2, and the fourth transistor M4 may form a third converter CVT3. The third converter CVT3 may be an inverting buck-boost converter. For example, the third gate driver 16233 may supply control signals PWM3 and PWM3B with a difference in phase by 180° to the second transistor M2 and the fourth transistor M4, respectively, thus enabling the third converter CVT3 to generate a second power voltage.

In an embodiment of the present disclosure, the surface area of each of the first transistor M1 and the second transistor M2 is greater than that of each of the third transistor M3, the fourth transistor M4, the fifth transistor M5, and the sixth transistor M6. In other words, the surface area of each of the transistors M1 and M2 provided outside an IC may be greater than that of each of the transistors M3, M4, M5, and M6 provided inside the IC. In an embodiment, the surface of each of the transistors M3 and M4 is greater than that of each of the transistors M5 and M6.

The first converter CVT1 may be used in the case where relatively low power is needed. The second converter CVT2 and the third converter CVT3 may be used in the case where relatively high power is needed. Therefore, the surface of each of the transistors M1, M2, M3, and M4 that form the second converter CVT2 and the third converter CVT3 may be greater than that of each of the transistors M5 and M6 that form the first converter CVT1. In an embodiment, a switching frequency of the first transistor M1 or the second transistor M2 is greater than that of the fifth transistor M5. In other words, the frequency of each of the control signals PWM3 and PWM2 may be greater than that of the control signal PWM1.

In an embodiment, the inductance of the first inductor L1 is greater than that of the second inductor L2 or the third inductor L3. Hence, the slope and the peak of current that flows through the first inductor L1 when the first converter CVT1 is operated may be reduced. In other words, ripples of a power voltage and power current that are generated by the first converter CVT1 may be reduced. For example, when the first converter CVT1 is driven, the load of the pixel component 14 is comparatively reduced, so that a relatively dark screen may be displayed. Because the human eye more sensitively recognizes a difference between relatively dark gray scales, the display quality can be efficiently enhanced according to the present embodiment.

In an embodiment, the surface area of the third transistor M3 and the surface area of the fourth transistor M4 is the same as each other. The surface area of the first transistor M1 and the surface area of the second transistor M2 may be the same as each other. The inductance of the second inductor L2 and the inductance of the third inductor L3 may be the same as each other. In other words, the second converter CVT2 and the third converter CVT3 may be configured to have the same specifications. The reason for this is for making uniform ripples of second power voltages that are simultaneously generated by the second converter CVT2 and the third converter CVT3 in a third phase to be described below, and thus preventing flicker from occurring in the pixel component 14. In an embodiment of the third phase to be described below, the control signals PWM2 and PWM3 have the same frequency and phase.

Figure 5:
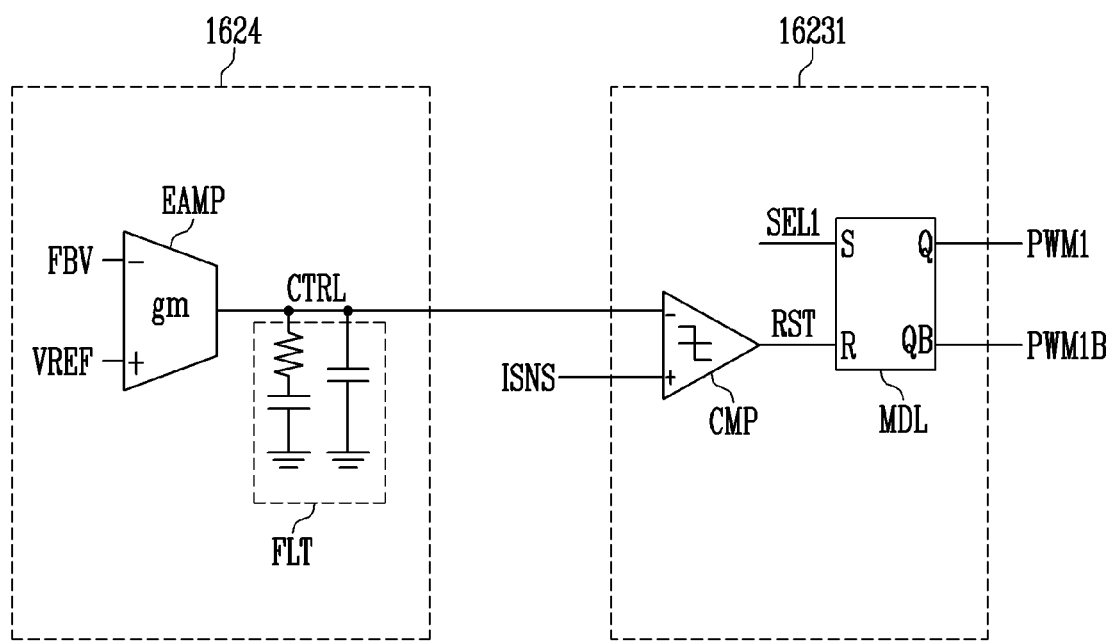
FIGS. 5 and 6 are diagrams for describing a control voltage generator and a gate driver in accordance with an embodiment of the present disclosure.
Figure 6:
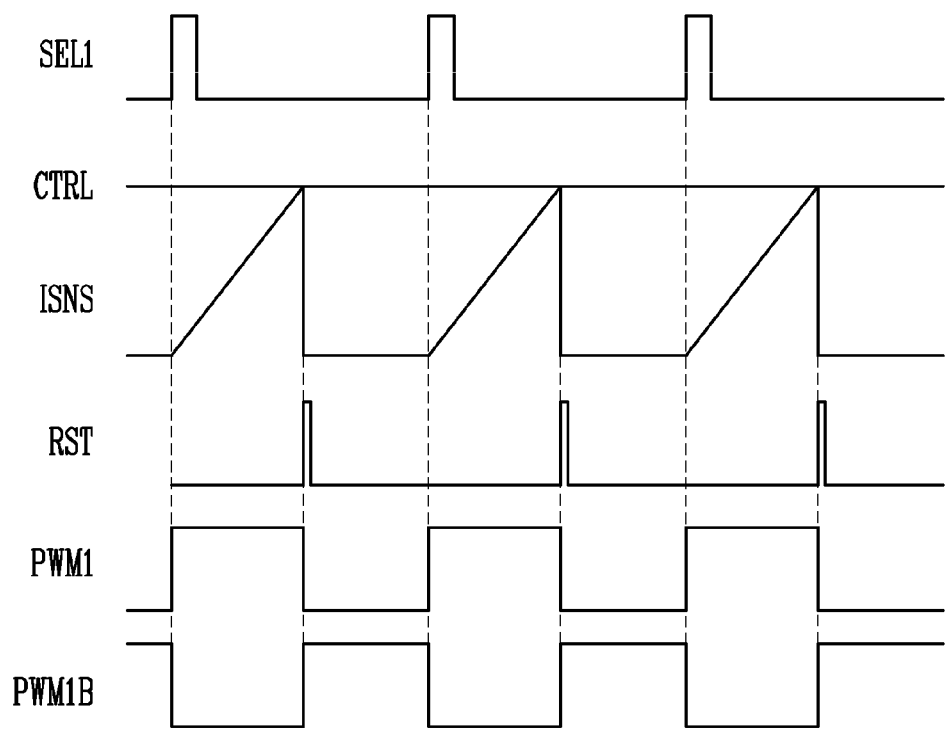

FIGS. 5 and 6 are diagrams for describing the control voltage generator 1624 and a gate driver (e.g., 16231) in accordance with an embodiment of the present disclosure.

Referring to FIG. 5, the control voltage generator 1624 in accordance with an embodiment of the present disclosure may include a comparator EAMP and a filter FLT.

The comparator EAMP may generate a control voltage CTRL corresponding to a value obtained by multiplying a difference between a feedback voltage FBV and a reference voltage VREF by a gain gm. The filter FLT may be a low-pass filter. The filter FLT may be omitted, or other kinds of filters may be used.

The first gate driver 16231 in accordance with an embodiment of the present disclosure may include a comparator CMP and a modulator MDL. Each of the second gate driver 16232 and the third gate driver 16233 may have the same configuration as the first gate driver 16231, other than the fact that the second gate driver 16232 may receive a second select signal SEL2 and the third gate driver 16233 may receive a third select signal SEL3; therefore, redundant explanation thereof will be omitted.

The comparator CMP may output a reset signal RST corresponding to a difference between the sensing information ISNS and the control voltage CTRL. The modulator MDL may include an S input terminal S configured to receive a first select signal SEL1, and an R input terminal R configured to receive a reset signal RST. The modulator MDL may include a Q output terminal Q configured to output a control signal PWM1, and a QB output terminal QB configured to output a control signal PWM1B. The control signal PWM1B may be an inverted signal of the control signal PWM1. For example, the modulator MDL may be an SR latch.

Referring to FIG. 6, the comparator CMP may output a reset signal RST having a logic high level when the sensing information ISNS reaches the control voltage CTRL. When the first select signal SEL1 having a logic high level is received, the modulator MDL generates a pulse of the control signal PWM1. For example, the control signal PWM1 may transition to a logic high level when the select signal SEL1 transitions to a logic high level. When the reset signal RST having a logic high level is received, the modulator MDL terminates the pulse of the control signal PWM1. For example, the control signal PWM1 may transition to a logic low level when the rest signal RST transitions to a logic high level. Furthermore, the modulator MDL may output a control signal PWM1B, which is an inverted signal of the control signal PWM1. In accordance with the present embodiment, a peak current of an inductor may be effectively controlled.

FIGS. 7 to 10 are diagrams for describing a method of driving the power provider in accordance with an embodiment of the present disclosure.

Figure 7:
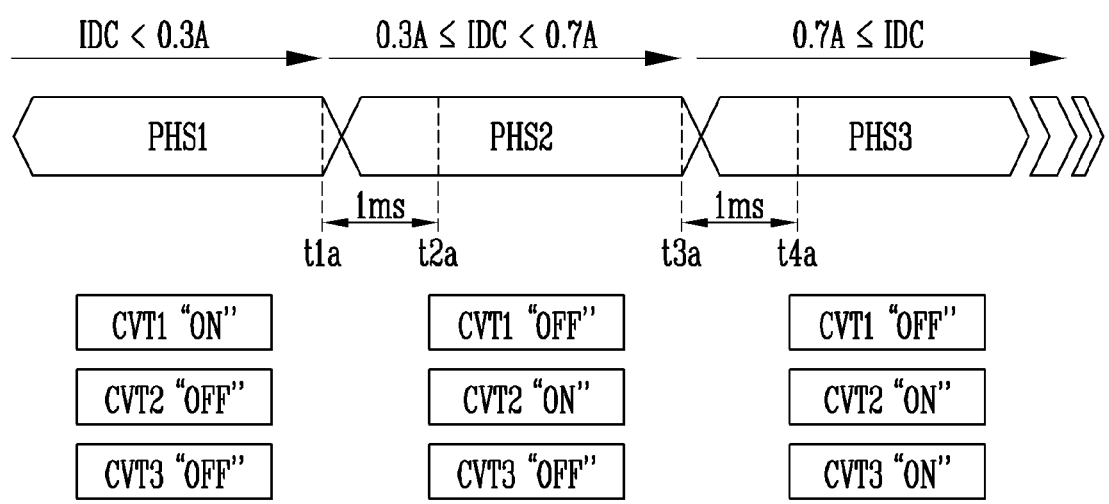
FIGS. 7 to 10 are diagrams for describing a method of driving the power provider in accordance with an embodiment of the present disclosure.

FIG. 7 illustrates a process in which the power provider 16 is operated in a sequence of a first phase PHS1, a second phase PHS2, and a third phase PHS3 in the case where power current IDC is increased.

The power provider 16 may supply a second power voltage using the first inductor L1 and the second power supply 162 when the power current IDC flowing through the second power line ELVSSL is less than a first reference value of 0.3 A. In other words, the converter selector 1622 may generate the first select signal SEL1 (refer to FIGS. 4 and 6) with reference to the sensing information ISNS when the power current IDC is less than the first reference value of 0.3 A. Here, the converter selector 1622 may generate neither the second select signal SEL2 nor the third select signal SEL3. For example, the converter selector 1622 may maintain the second select signal SEL2 and the third select signal SEL3 at a logic low level. In other words, in the first phase PHS1, the power provider 16 may use only the first converter CVT1 to generate the second power voltage. As described above, the first converter CVT1 is designed to be efficiently used in the case where low power is needed, so that the power provider 16 may provide the second power voltage efficiently in terms of power consumption.

When the power current IDC is increased and is greater than the first reference value of 0.3 A and less than a second reference value of 0.7 A, the power provider 16 may supply the second power voltage using the second inductor L2, the first transistor M1, and the second power supply 162. In other words, the converter selector 1622 may generate the second select signal SEL2 with reference to the sensing information ISNS when the power current IDC is increased and is greater than the first reference value of 0.3 A and less than the second reference value of 0.7 A. Here, the converter selector 1622 may generate neither the first select signal SEL1 nor the third select signal SEL3. For example, the converter selector 1622 may maintain the first select signal SEL1 and the third select signal SEL3 at a logic low level. In other words, in the second phase PHS2, the power provider 16 may use only the second converter CVT2 to generate the second power voltage. As described above, the second converter CVT2 is designed to be efficiently used in the case where relatively high power is needed, so that the power provider 16 may provide the second power voltage efficiently in terms of power consumption.

When the power current IDC is increased and is greater than the second reference value of 0.7 A, the power provider 16 may supply the second power voltage using the second inductor L2, the third inductor L3, the first transistor M1, the second transistor M2, and the second power supply 162. In other words, the converter selector 1622 may generate the second select signal SEL2 and the third select signal SEL3 with reference to the sensing information ISNS when the power current IDC is increased and is greater than the second reference value of 0.7 A. Here, the second select signal SEL2 and the third select signal SEL3 may have the same frequency and phase. Here, the converter selector 1622 does not generate the first select signal SEL1. For example, the converter selector 1622 may maintain the first select signal SEL1 at a logic low level. In other words, in the third phase PHS3, the power provider 16 may use the second converter CVT2 and the third converter CVT3 to generate the second power voltage. As described above, the second converter CVT2 and the third converter CVT3 are designed to be efficiently used in the case where relatively high power is needed, so that the power provider 16 may provide the second power voltage efficiently in terms of power consumption when high power is needed. Furthermore, because the second converter CVT2 and the third converter CVT3 may be designed to have the same specifications, ripples of second power voltages that are simultaneously generated by the second converter CVT2 and the third converter CVT3 may be made uniform, whereby flicker can be prevented from occurring in the pixel component 14.

In an embodiment of the present disclosure, during a transition period t1a to t2a during which the first phase PHS1 is switched to the second phase PHS2, the first converter CVT1 and the second converter CVT2 may be simultaneously driven. For example, the first converter CVT1 may continue to be driven during the transition period t1a to t2a and stop being driven after t2a. Hence, the output voltage may be prevented from rapidly varying attributable to a change of the converter to be used. The time point t1a may be a time point at which the current sensor 1621 senses that the power current IDC has reached the first reference value of 0.3 A.

In an embodiment of the present disclosure, during a transition period t3a to t4a during which the second phase PHS2 is switched to the third phase PHS3, the second converter CVT2 and the third converter CVT3 may be simultaneously driven. For example, the third converter CVT3 begin being driven at a beginning of the transition period t3a without waiting for the transition period t3a to t4a to elapse. Hence, the output voltage may be prevented from rapidly varying attributable to a change of the converter to be used. The time point t3a may be a time point at which the current sensor 1621 senses that the power current IDC has reached the second reference value of 0.7 A.

Figure 8:
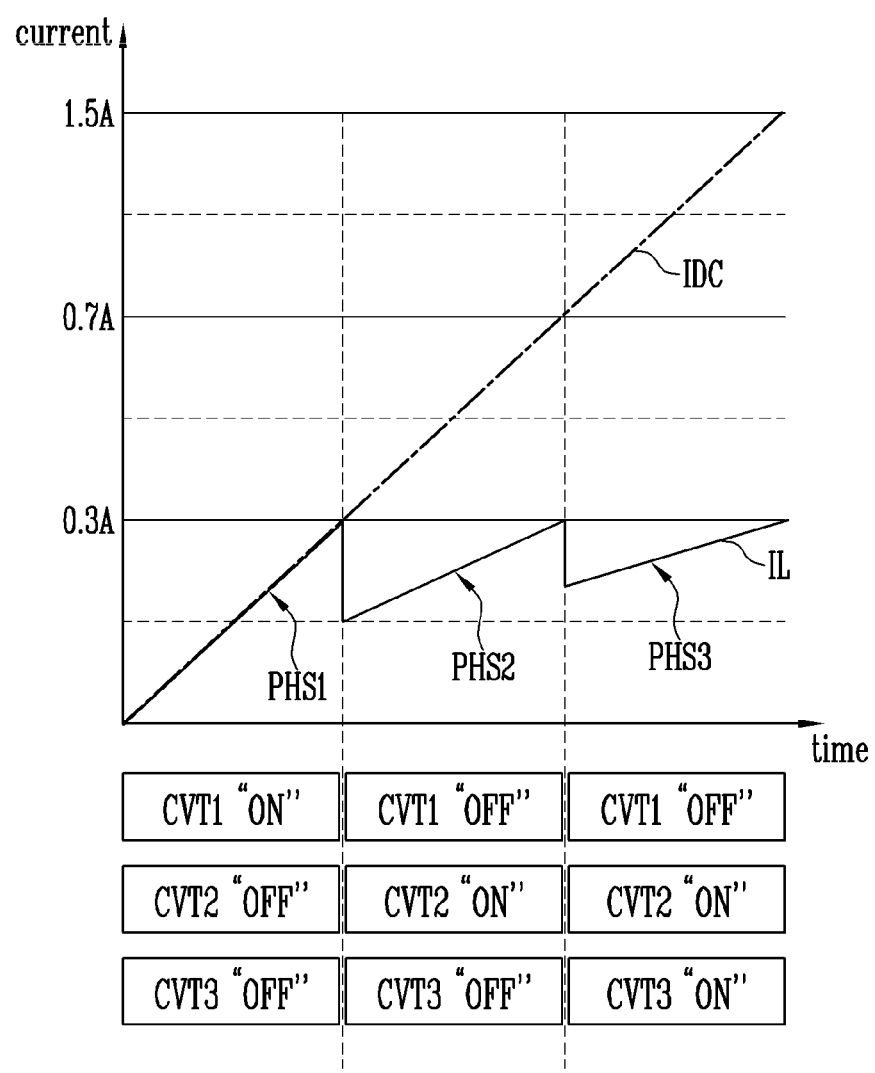

Referring to FIG. 8, it can be seen that even if the power current IDC continuously increases, the maximum of inductor current IL in each phase PHS1, PHS2, PHS3 is limited to 0.3 A, so that the power provider 16 can be driven efficiently in terms of power consumption.

Figure 9:
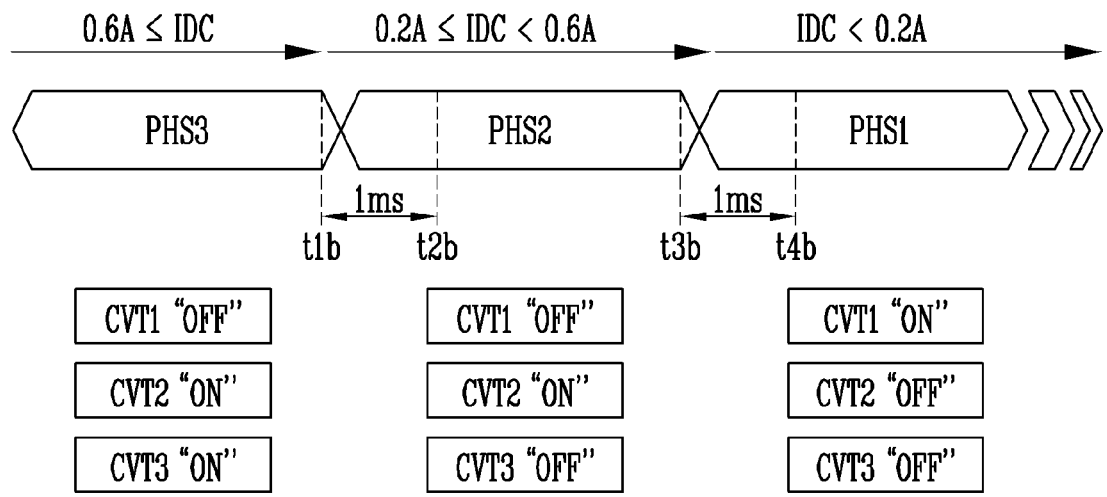

FIG. 9 illustrates a process in which the power provider 16 is operated in a sequence of the third phase PHS3, the second phase PHS2, and the first phase PHS1 in the case where power current IDC is reduced.

When the power current IDC is greater than a third reference value of 0.6 A, the power provider 16 may supply the second power voltage using the second inductor L2, the third inductor L3, the first transistor M1, the second transistor M2, and the second power supply 162. In other words, the converter selector 1622 may generate the second select signal SEL2 and the third select signal SEL3 with reference to the sensing information ISNS when the power current IDC is greater than the third reference value of 0.6 A. Here, the second select signal SEL2 and the third select signal SEL3 may have the same frequency and phase. Here, the converter selector 1622 may not generate the first select signal SELL For example, the converter selector 1622 may maintain the first select signal SEL1 at a logic low level. In other words, in the third phase PHS3, the power provider 16 may use the second converter CVT2 and the third converter CVT3 to generate the second power voltage. As described above, the second converter CVT2 and the third converter CVT3 are designed to be efficiently used in the case where relatively high power is needed, so that the power provider 16 may provide the second power voltage efficiently in terms of power consumption when high power is needed. Furthermore, because the second converter CVT2 and the third converter CVT3 may be designed to have the same specifications, ripples of second power voltages that are simultaneously generated by the second converter CVT2 and the third converter CVT3 may be made uniform, whereby flicker can be prevented from occurring in the pixel component 14.

When the power current IDC is reduced and is greater than a fourth reference value of 0.2 A and less than the third reference value of 0.6 A, the power provider 16 may supply the second power voltage using the second inductor L2, the first transistor M1, and the second power supply 162. In other words, the converter selector 1622 may generate the second select signal SEL2 with reference to the sensing information ISNS when the power current IDC is reduced and is greater than the fourth reference value of 0.2 A and less than the third reference value of 0.6 A. Here, the converter selector 1622 may generate neither the first select signal SEL2 nor the third select signal SEL3. For example, the converter selector 1622 may maintain the first select signal SEL1 and the third select signal SEL3 at a logic low level. In other words, in the second phase PHS2, the power provider 16 may use only the second converter CVT2 to generate the second power voltage. As described above, the second converter CVT2 is designed to be efficiently used in the case where relatively high power is needed, so that the power provider 16 may provide the second power voltage efficiently in terms of power consumption.

The power provider 16 may supply the second power voltage using the first inductor L1 and the second power supply 162 when the power current IDC is reduced and is less than the fourth reference value of 0.2 A. In other words, when the power current IDC is reduced and less than the fourth reference value of 0.2 A, the converter selector 1622 may generate the first select signal SEL1. Here, the converter selector 1622 may generate neither the second select signal SEL2 nor the third select signal SEL3. For example, the converter selector 1622 may maintain the second select signal SEL2 and the third select signal SEL3 at a logic low level. In other words, in the first phase PHS1, the power provider 16 may use only the first converter CVT1 to generate the second power voltage. As described above, the first converter CVT1 is designed to be efficiently used in the case where low power is needed, so that the power provider 16 may provide the second power voltage efficiently in terms of power consumption.

In an embodiment, the third reference value (0.6 A) is greater than the first reference value (0.3 A) and less than the second reference value (0.7 A). Here, the fourth reference value (0.2 A) is less than the first reference value (0.3 A). For example, the first reference value (0.3 A) may be 0.3 ampere, the second reference value (0.7 A) may be 0.7 ampere, the third reference value (0.6 A) may be 0.6 ampere, and the fourth reference value (0.2 A) may be 0.2 ampere. Because the first reference value (0.3 A) and the fourth reference value (0.2 A) are set to be different from each other, the first phase PHS1 and the second phase PHS2 may be prevented from being excessively frequently switched from one to another. Furthermore, because the second reference value (0.7 A) and the third reference value (0.6 A) are set to be different from each other, the second phase PHS2 and the third phase PHS3 may be prevented from being excessively frequently switched from one to another.

In an embodiment of the present disclosure, during a transition period t1b to t2b during which the third phase PHS3 is switched to the second phase PHS2, the second converter CVT2 and the third converter CVT3 may be simultaneously driven. For example, the third converter CVT3 may continue to be driven during the transition period t1b to t2b and stop being driven after t2b. Hence, the output voltage may be prevented from rapidly varying attributable to a change of the converter to be used. The time point t1b may be a time point at which the current sensor 1621 senses that the power current IDC has reached the third reference value of 0.6 A.

In an embodiment of the present disclosure, during a transition period t3b to t4b during which the second phase PHS2 is switched to the first phase PHS1, the first converter CVT1 and the second converter CVT2 may be simultaneously driven. For example, the second converter CVT2 may continue to be driven during the transition period t3b to t4b and stop being driven after t4b. Hence, the output voltage may be prevented from rapidly varying attributable to a change of the converter to be used. The time point t3b may be a time point at which the current sensor 1621 senses that the power current IDC has reached the fourth reference value of 0.2 A.

Figure 10:
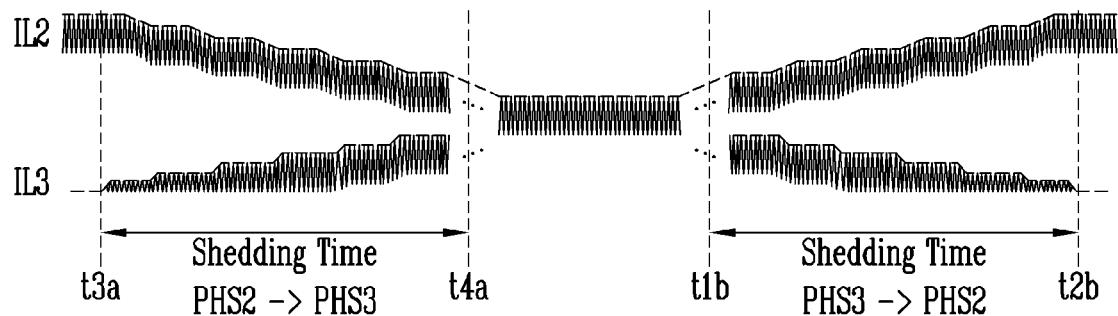

Referring to FIG. 10, there are illustrated examples of inductor currents IL2 and IL3 during the transition periods t3a to t4a and t1b to t2b between the second phase PHS2 and the third phase PHS3. The second inductor current IL2 may be current that flows through the second inductor L2. The third inductor current IL3 may be current that flows through the third inductor L3.

Figure 11:
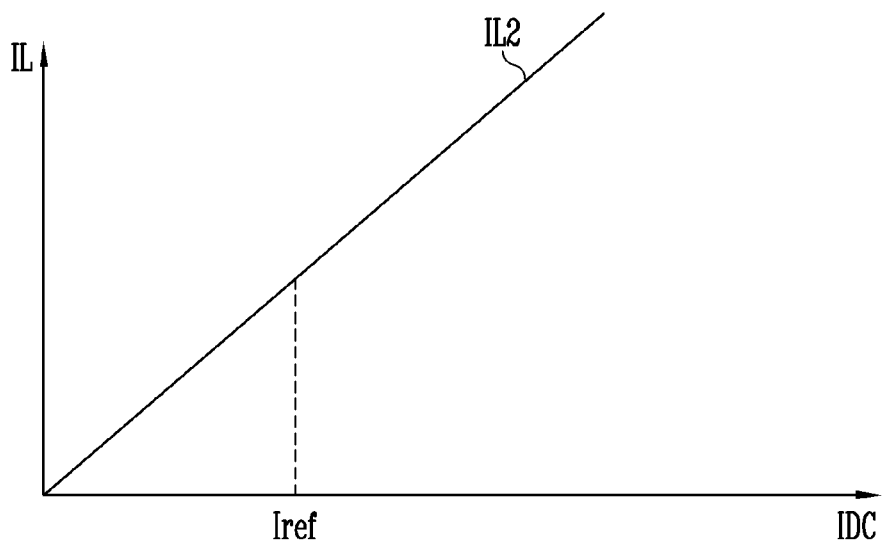
FIGS. 11 and 12 are diagrams for describing effects of the power provider in accordance with an embodiment of the present disclosure.
Figure 12:
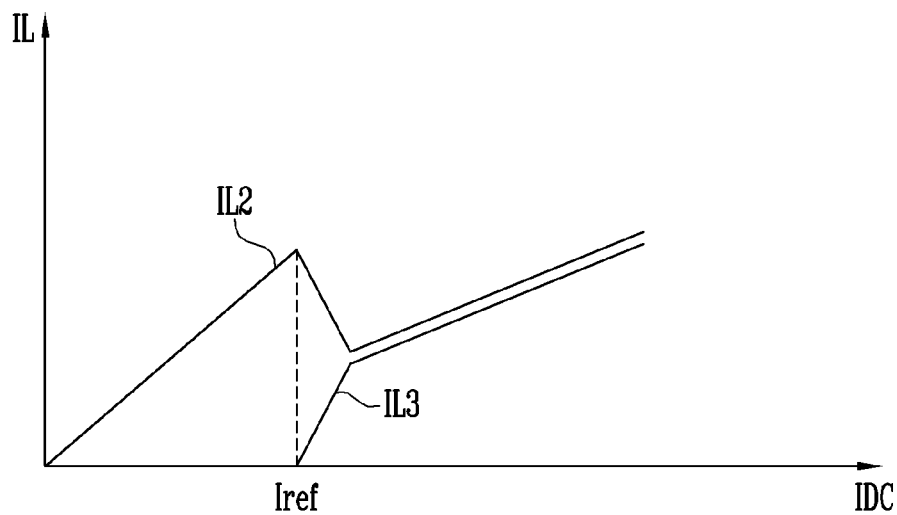

FIGS. 11 and 12 are diagrams for describing effects of the power provider in accordance with an embodiment of the present disclosure.

Referring to FIG. 11, there is illustrated a graph showing the inductor current IL as a function of the power current IDC when the power provider 16 is operated using the single second converter CVT2, regardless of the second phase PHS2 and the third phase PHS3. The inductor current IL may be the second inductor current IL2. Here, as the power current IDC is increased, the second doctor current IL2 may be increased, regardless of a reference value Iref (e.g., the second reference value of 0.7 A).

Referring to FIG. 12, there is illustrated a graph showing the inductor current IL as a function of the power current IDC when the power provider 16 is operated using the second converter CVT2 and the third converter CVT3 reflecting the second phase PHS2 and the third phase PHS3. When the power current IDC is less than the reference value Iref (e.g., in the second phase PHS2), only the second converter CVT2 may generate the power current IDC. When the power current IDC is greater than the reference value Tref (e.g., in the third phase PHS3), the second converter CVT2 and the third converter CVT3 may generate the power current IDC together. Here, the inductor current IL may include the second inductor current IL2 and the third inductor current IL3.

In accordance with an embodiment of FIG. 12, only the second converter CVT2 may be used in a relatively small-load period so that switching loss can be reduced. In consideration of the fact that the switching loss is affected by the capacitance of a transistor, the switching loss can be reduced because there is no effect of the capacitance of a transistor included in the third converter CVT3.

In a relatively large-load period, the second converter CVT2 and the third converter CVT3 may be driven together so that conduction loss can be reduced. In consideration of the fact that the conduction loss is affected by on-resistance, a plurality of current paths are generated by driving the second converter CVT2 and the third converter CVT3 together, whereby the on-resistance can be reduced.

In a power provider and a display device including the power provider in accordance with an embodiment of the present disclosure, a power voltage may be provided efficiently in terms of power consumption in response to the magnitude of power current.

Referring back to FIG. 4, according to an embodiment, certain elements may be omitted. For example, in a variation of FIG. 4, the third gate driver 16233, the third inductor L3, the second transistor M2 and the fourth transistors M4 are omitted. In this variation, the power supply device is configured to supply a power voltage using the first inductor L1 and the power IC when power current flowing through the power line is less than a first reference value; and supply the power voltage using the second inductor L2, the first transistor M1, and the power IC when the power current is greater than the first reference value and less than a second reference value.

Although the embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A power supply device comprising:
   a first inductor;
   a second inductor;
   a third inductor;
   a first transistor including a first electrode configured to receive an input voltage, and a second electrode connected to the second inductor;
   a second transistor including a first electrode configured to receive the input voltage, and a second electrode connected to the third inductor; and
   a power integrated chip (IC) including input terminals respectively connected to the first inductor, the second inductor, and the third inductor, and an output terminal connected to a power line,
   wherein the power supply device is configured to supply a power voltage using the first inductor and the power IC when power current flowing through the power line is less than a first reference value, supply the power voltage using the second inductor, the first transistor, and the power IC when the power current is increased and is greater than the first reference value and less than a second reference value, and supply the power voltage using the second inductor, the third inductor, the first transistor, the second transistor, and the power IC when the power current is increased and is greater than the second reference value.

2. The power supply device according to claim 1, wherein the power supply device is configured to supply the power voltage using the second inductor, the third inductor, the first transistor, the second transistor, and the power IC when the power current is greater than the third reference value, supply the power voltage using the second inductor, the first transistor, and the power IC when the power current is reduced and is greater than a fourth reference value and less than the third reference value, and supply the power voltage using the first inductor and the power IC when the power current is reduced and is less than the fourth reference value.

3. The power supply device according to claim 2, wherein the third reference value is greater than the first reference value and less than the second reference value, and
   wherein the fourth reference value is less than the first reference value.

4. The power supply device according to claim 1, wherein the power IC comprises:
   a third transistor including a first electrode connected to the second inductor, and a second electrode connected to the output terminal;
   a fourth transistor including a first electrode connected to the third inductor, and a second electrode connected to the output terminal;
   a fifth transistor including a first electrode configured to receive the input voltage, and a second electrode connected to the first inductor; and
   a sixth transistor including a first electrode connected to the first inductor, and a second electrode connected to the output terminal.

5. The power supply device according to claim 4, wherein a surface area of each of the first transistor and the second transistor is greater than a surface area of each of the third transistor, the fourth transistor, the fifth transistor, and the sixth transistor.

6. The power supply device according to claim 5,
   wherein the surface area of the third transistor is identical to the surface area of the fourth transistor,
   wherein the surface area of the first transistor is identical to the surface area of the second transistor, and
   wherein an inductance of the second inductor is identical to an inductance of the third inductor.

7. The supply device according to claim 6, wherein an inductance of the first inductor is greater than the inductance of the second inductor.

8. The power supply device according to claim 7, wherein a switching frequency of the first transistor or the second transistor is greater than a switching frequency of the fifth transistor.

9. The power supply device according to claim 4, further comprising:
   a current sensor configured to sense the power current through the second electrode of the third transistor, the second electrode of the fourth transistor, the second electrode of the sixth transistor, and provide sensing information based on the sensed power current; and a converter selector configured to generate a first select signal, a second select signal, and a third select signal based on the sensing information.

10. The power supply device according to claim 9, further comprising:
a first gate driver configured to control turning on or off of the fifth transistor and the sixth transistor based on the first select signal and the sensing information;
a second gate driver configured to control turning on or off of the first transistor and the third transistor based on the second select signal and the sensing information; and
a third gate driver configured to control turning on or off of the second transistor and the fourth transistor based on the third select signal and the sensing information.

11. The power supply device according to claim 10, further comprising:
feedback resistors connected in series to the output terminal; and
a control voltage generator configured to generate a control voltage based on a feedback voltage received from a node between the feedback resistors, and
wherein the first gate driver, the second gate driver, and the third gate driver control turning on or off of the corresponding transistors based on the control voltage.

12. A display device comprising:
a plurality of pixels configured to display an image; and
a power supply device configured to supply a power voltage to a power line connected in common to the plurality of pixels,
wherein the power supply device comprises:
a first inductor;
a second inductor;
a third inductor;
a first transistor connected between an input voltage and the second inductor;
a second transistor connected between the input voltage and the third inductor; and
a power integrated chip (IC) including input terminals respectively connected to the first inductor, the second inductor, and the third inductor, and an output terminal connected to the power line,
wherein the power supply device supplies the power voltage using the first inductor and the power IC when power current flowing through the power line is less than a first reference value, supplies the power voltage using the second inductor, the first transistor, and the power IC when the power current is increased and is greater than the first reference value and less than a second reference value, and supplies the power voltage using the second inductor, the third inductor, the first transistor, the second transistor, and the power IC when the power current is increased and is greater than the second reference value.

13. The display device according to claim 12, wherein the power supply device supplies the power voltage using the second inductor, the third inductor, the first transistor, the second transistor, and the power IC when the power current is greater than the third reference value, supplies the power voltage using the second inductor, the first transistor, and the power IC when the power current is reduced and is greater than a fourth reference value and less than the third reference value, and supplies the power voltage using the first inductor and the power IC when the power current is reduced and is less than the fourth reference value.

14. The display device according to claim 13,
wherein the third reference value is greater than the first reference value and less than the second reference value, and
wherein the fourth reference value is less than the first reference value.

15. The display device according to claim 12, wherein the power IC comprises:
a third transistor including a first electrode connected to the second inductor, and a second electrode connected to the output terminal;
a fourth transistor including a first electrode connected to the third inductor, and a second electrode connected to the output terminal;
a fifth transistor including a first electrode configured to receive the input voltage, and a second electrode connected to the first electrode of the first inductor; and
a sixth transistor including a first electrode connected to the first electrode of the first inductor, and a second electrode connected to the output terminal.

16. The display device according to claim 15, wherein a surface area of each of the first transistor and the second transistor is greater than a surface area of each of the third transistor, the fourth transistor, the fifth transistor, and the sixth transistor.

17. The display device according to claim 16,
wherein the surface area of the third transistor is identical to the surface area of the fourth transistor,
wherein the surface area of the first transistor is identical to the surface area of the second transistor,
wherein an inductance of the second inductor is identical to an inductance of the third inductor.

18. The display device according to claim 17, wherein an inductance of the first inductor is greater than the inductance of the second inductor.

19. The display device according to claim 18, wherein a switching frequency of the first transistor or the second transistor is greater than a switching frequency of the fifth transistor.

20. The display device according to claim 15, wherein the power supply device comprises:
a current sensor configured to sense the power current through the second electrode of the third transistor, the second electrode of the fourth transistor, the second electrode of the sixth transistor, and provide sensing information based on the sensed power current;
a converter selector configured to generate a first select signal, a second select signal, and a third select signal based on the sensing information;
feedback resistors connected in series to the output terminal;
a control voltage generator configured to generate a control voltage based on a feedback voltage received from a node between the feedback resistors;
a first gate driver configured to control turning on or off of the fifth transistor and the sixth transistor based on the first select signal, the sensing information, and the control voltage;
a second gate driver configured to control turning on or off of the first transistor and the third transistor based on the second select signal, the sensing information, and the control voltage; and
a third gate driver configured to control turning on or off of the second transistor and the fourth transistor based on the third select signal, the sensing information, and the control voltage.

* * * * *